United States Patent [19]
Kühn

[11] 3,742,927
[45] July 3, 1973

[54] VALVE FOR AN INTERNAL COMBUSTION ENGINE OR THE LIKE

[75] Inventor: Karl Walter Kühn, Saint-Germain-En-Laye, France

[73] Assignee: Societe D'Etudes De Machines Thermiques, Saint-Denis, France

[22] Filed: May 26, 1971

[21] Appl. No.: 147,045

[30] Foreign Application Priority Data
May 27, 1970 France .............................. 7019362

[52] U.S. Cl. ............................................. 123/189
[51] Int. Cl. ............................................. F01l 3/00
[58] Field of Search ................... 123/188 R, 188 A, 123/188 VA, 188 S, 188 GC, 90.1, 90.27, 90.33, 90.67, 189; 251/367; 137/533.29 533.31, 454.4

[56] References Cited
UNITED STATES PATENTS

| | | | |
|---|---|---|---|
| 3,447,524 | 6/1969 | Pfleghaar | 123/189 |
| 3,528,394 | 9/1970 | Cummins | 123/189 |
| 2,943,639 | 7/1960 | Smith | 137/533.29 |
| 2,814,283 | 11/1957 | Gassmann et al. | 123/188 GC |
| 1,028,105 | 6/1912 | Ford | 137/533.29 |

Primary Examiner—Charles J. Myhre
Assistant Examiner—Barry Grossman
Attorney—Kenyon & Kenyon Reilly Carr & Chapin

[57] ABSTRACT

An internal combustion engine valve, of the type comprising a body forming a valve guide and a cage forming a removable valve seat adjacent to the said body, which are mounted in the cylinder head, characterized by a detachable connecting device assembling the said body with the said cage and made from a heat-resisting material.

6 Claims, 3 Drawing Figures

PATENTED JUL 3 1973
3,742,927
Fig. 1.
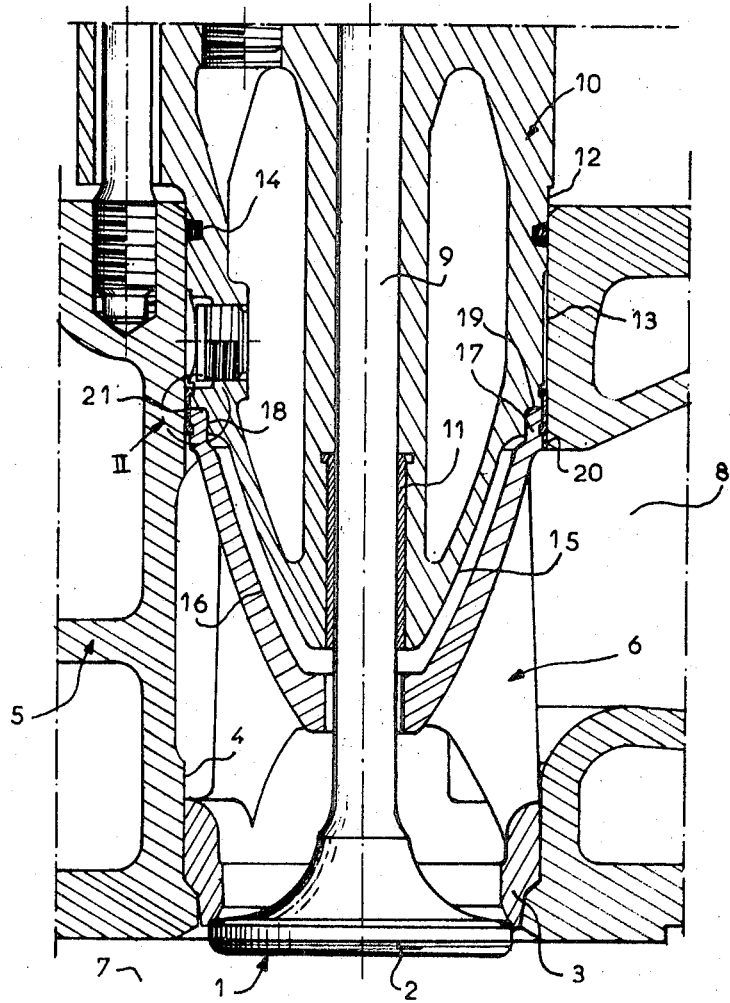
Fig. 3.
Fig. 2.
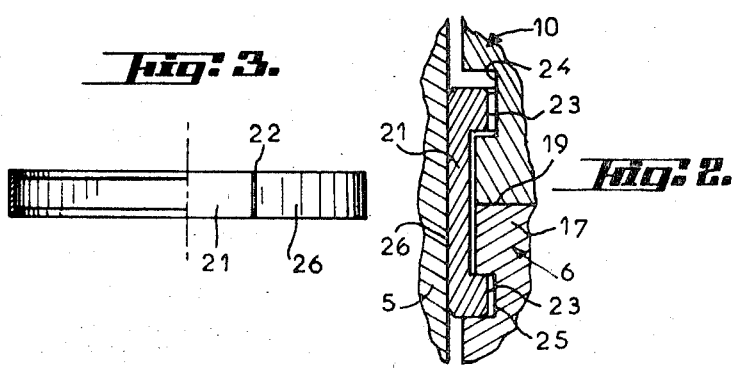
INVENTOR
KARL WALTER KÜHN
BY
Kenyon & Kenyon Reilly Carr & Chapin
ATTORNEYS

VALVE FOR AN INTERNAL COMBUSTION ENGINE OR THE LIKE

The present invention relates generally to and has essentially for its object a device forming a valve arrangement for a heat engine and in particular for an internal combustion engine or the like, as well as the various applications and uses resulting from the carrying out thereof and the systems, assemblies, apparatus, mechanisms, equipments and plants provided with such valve assemblies.

It is known that in internal combustion engines, for instance large stationary or marine engines, the valve seat is solid or integral with a valve cage with which it is made in a single removable piece adjacent to the valve guide body and mounted with the latter in a common bore or housing provided in the cylinder head, thus facilitating the mounting and repair operations. In a valve assembly so designed, the removal of the seat, i.e., of the valve cage, is carried out as a rule by exerting an upward traction force on the upper portion of the valve guide body, which transmits this traction force to the valve stem through the medium of the valve spring and its bearing cup, so that the mushroom- or tulip-shaped valve head pulls the valve seat on which it is applied. However, especially in engines of the Diesel type operating on heavy fuels, there occurs in the long run an accumulation of petroleum coke or of carbon deposits in the joint between the seat of the valve, especially the exhaust valve, and the cylinder head, whereby the valve seat sticks to the cylinder head. This sticking of the valve seat to the cylinder head is often so strong that the valve seat cannot be removed according to the procedure described above without entailing risks of mechanical damage. Indeed, since in this case the valve seat is seized and thus clogs the valve itself, the valve guide body separates from the valve seat to which it is not normally fixed when the abovementioned traction force is exerted, so that it strongly compresses the valve spring until the spring turns become joined to one another, and thereafter the cup or bearing element forming an upper abutment for the spring, thus deforming the said element.

The invention has mainly for its purpose to eliminate the aforementioned drawbacks and difficulties by creating a mounting arrangement for the valve, in particular for an exhaust valve, enabling the traction force exerted by means of the valve guide body to be applied directly and positively on the valve cage and, therefore, the valve seat, thus eliminating any indirect transmission of the traction force to the valve seat through the medium of the valve spring, of the abutment cup for the said spring and of the valve proper. To this end, the valve arrangement according to the invention is characterized by a removable connecting device assembling the said valve cage with the valve guide body and made from a heat-resistant material.

According to another feature of the invention, the said connecting device comprises means ensuring a sealed contact joint with the inner wall of the cylinder head bore containing the said valve. The said valve cage, which is made for instance from heat-resisting steel, constitutes generally a shield protecting against heat for the valve guide body, so that the additional imperviousness thus obtained perfects or completes the said protection of the valve guide body by preventing any escape of hot burnt gases in the direction of the valve guide body through the joint between the adjacent upper portion of the valve cage and the cylinder head wall.

According to another feature of the invention, the said connecting device is constituted by at least one retaining clamp member which is at least approximately yoke-shaped in cross-section and whose both legs co-operate, for instance with a predetermined fit or play, with respectively two lateral catching or hooking means such as flanges, collars, shoulders, hollows or recesses provided respectively on the respective adjacent portions or ends of the said valve guide body and valve cage.

The invention will be better understood and other purposes, features, details and advantages thereof will appear more clearly as the following explanatory description proceeds, with reference to the appended diagrammatic drawing given solely by way of example illustrating one form of embodiment of the invention and wherein:

FIG. 1 is a fragmentary sectional view of an internal-combustion-engine valve provided with an arrangement according to the invention;

FIG. 2 is a detailed sectional fragmentary view, at a larger scale, of the encircled portion II of FIG. 1;

FIG. 3 is an isolated view, at a smaller scale, of the coupling ring shown respectively in half-section and outer half-view.

According to the form of embodiment shown in FIG. 1, a Diesel engine exhaust valve indicated generally by the reference numeral 1, has its mushroom-shaped head 2 applied on a valve seat 3 set in the corresponding bore 4 of the cylinder head 5. The valve seat 3 is solid with a valve cage 6 defining passageways for the hot burnt gases proceeding from the combustion chamber 7 (not shown), in order to discharge the said gases through the exhaust port 8. The valve stem 9 passes successively through the hub of the valve cage 6 through a corresponding central orifice and the valve guide body 10 through the central bore thereof, in which is mounted a valve guide-sleeve 11 arranged in sliding-contact relationship with the stem 9 of the valve.

The body 10 is set, through the medium of a cylindrical bearing surface 12, in the bore 13 of the cylinder head 5 in coaxial relationship with the axis of the valve 1, and a seal ring or like annular gasket or packing 14 inserted in a suitable groove provided in the body 10 ensures an internal contact with the wall of the bore 13 at the upper portion of the latter. The lower end 15 of the body 10 has a substantially ogival convex shape projecting into a mating hollow or concave portion 16 of the valve cage 6. The upper end 17 of the cage 6 has a substantially annular cylindrical shape extending in coaxial relationship with the valve axis and in which is placed, for instance with a sliding fit, a mating cylindrical shouldered bearing-surface 18 of the body 10 resting with its shoulder 19 upon the adjacent terminal or endmost face of the valve cage 6. The outer diameters of the adjacent portions 17 and 19 respectively of the cage 6 and the body 10 are preferably substantially equal so that their outer lateral surfaces are substantially aligned and the said outer diameters are smaller than the diameter of the bore 13 so that an annular space 20 remains between, on the one hand, the wall of the bore 13 and, on the other hand, the mutually contacting portions of the body 10 and the cage 6, for a substantially centred assembly of the latter.

A connecting member coupling the body 10 with the cage 6 is constituted advantageously by a ring, collar or the like 21 having the appearance shown in FIGS. 2 and 3 and made preferably from a heat-resisting material. The said ring is preferably resiliently expansible or split at 22 (FIG. 3) in order to be slipped and mounted on the outer periphery of the body 10 and of the cage 6. Each peripheral edge is provided with at least one flange 23 projecting radially inwardly, forming for instance a continuous circular rib penetrating into a corresponding groove or slot 24 or 25 provided in the body 10 or the cage 6. The ring 21 is thus advantageously U- of C-shaped in cross-section and at least one or its legs, for instance 23, penetrates with a predetermined play into the groove or slot 24 provided on the peripheral lateral surface of the body 10 as shown in FIG. 2.

The distance separating internally from one another the two legs 23 of the U-shaped ring 21 is at least equal to and preferably greater than the distance between the radial walls closest to one another of, respectively, the grooves 24 and 25 of the body 10 and of the cage 6 when the body or the cage are in mutual abutment against one another as shown in FIG. 2.

The connecting ring 21 advantageously has a substantially cylindrical outer lateral surface of revolution 26 extending substantially in coaxial relationship with the bore 13 of the cylinder head 5 containing the body 10 and the cage 6, so as to be applied through natural resilient radial expansion and impervious-contact relationship, on the wall of the said bore in the same manner as that of a sealing piston ring known per se, thus closing any passageway in the peripheral intermediate annular space 20 connecting the lower cavity, through which the hot exhaust gases pass, with the upper cavity containing the body 10. To this end, at least one of the flanges 23 of the ring 21, preferably the lower flange, penetrates with a sliding sealing fit into the corresponding groove 25 of the valve cage 6 so as to prevent any escape of hot gases tending to pass between the ring 25 and the cage 6 and capable of causing carbon deposits.

According to a modified form of embodiment, the connecting ring 21 may be replaced by a threaded assembly connecting the body 10 and the cage 6 by their adjacent portions, for instance in such a manner that the body 10 may be screwed by a surface threaded at 18 into a corresponding threaded sleeve 17 solid or integral with the cage 6.

According to another modified form of embodiment, the connecting device may be of the bayonet type, or of the quick-acting or "fireman" type used in particular for fire hoses.

Of course, the invention is by no means limited to the forms of embodiment described and illustrated which have been given by way of example only. In particular, it comprises all the means constituting technical equivalents to the means described as well as their combinations, should the latter be carried out according to the spirit of the invention.

What is claimed is:

1. In an internal combustion engine having cylinder head means with at least one overhead valve assembly mounted in one substantially cylindrical bore thereof and comprising a body forming a valve guide and a spider-like cage positioned below said body and forming a removable valve seat, said body and cage having mutually engaging substantially cylindrical coaxial portions of same diameter abutting each other through opposing overlying end faces thereof, the improvement consisting in that said engaging portions are each formed with a radially outward extending shoulder, a detachable split retaining clip ring member to hold said portions together, said ring member being formed with a pair of spaced overlying radially inward projecting peripheral upper and lower parallel flanges for clamping said shoulders therebetween, the spacing of said flanges being larger than that between said shoulders.

2. An arrangement according to claim 1, wherein each one of said engaging portions is formed with a peripheral groove defined by a pair of axially spaced radial walls, that one of which that is closest to the other engaging portion forming one of said shoulders, the peripheral groove provided in said cage having an axial width corresponding substantially to the thickness of said lower flange, said lower flange engaging said last-named groove in substantially sealing relationship with a sliding fit whereas the other groove provided in said body has an axial width larger than the thickness of said upper flange which accordingly engages said other groove with axial clearance, said ring member being resiliently expansible outwards and exhibiting a substantially cylindrical outer side face matingly engaging the wall of said cylindrical bore in sealing sliding relationship therewith.

3. An arrangement according to claim 1, wherein said flanges are provided adjacent the peripheral top and bottom edges, respectively of said ring member.

4. An arrangement according to claim 1, wherein the common diameter of said engaging portions is smaller than that of said bore so as to leave an annular space therebetween.

5. An arrangement according to claim 1, wherein the engaging portion of said cage is formed by an upper substantially cylindrical annular end rim thereof whereas the engaging portion of said body comprises a substantially cylindrical coaxial wall portion snugly fitting in centering relationship into said rim and a radial shoulder portion bearing on the top end face of said rim.

6. An arrangement according to claim 2, wherein said flanges are provided at the peripheral top and bottom edges, respectively, of said ring member, the common diameter of said engaging portions being smaller than that of said bore so as to leave an annular space therebetween, the engaging portion of said cage being formed by an upper substantially cylindrical annular end rim thereof whereas the engaging portion of said body comprises a substantially cylindrical coaxial wall portion snugly fitting in centering relationship into said rim and a radial shoulder portion bearing on the top end face of said rim.

\* \* \* \* \*